Figure 1:
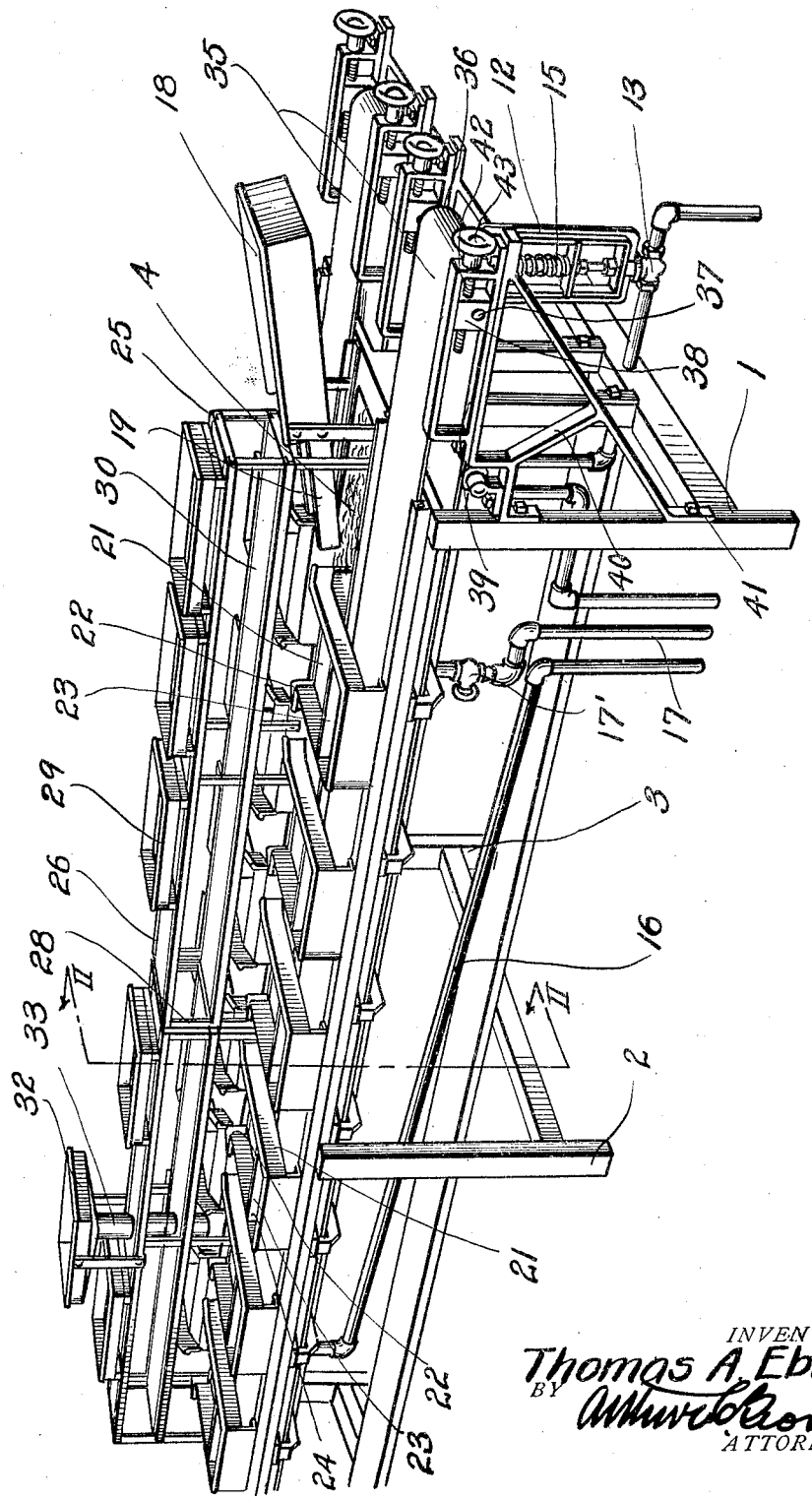

T. A. EBAUGH.
CONFECTION APPARATUS.
APPLICATION FILED NOV. 25, 1919.

1,397,757.

Patented Nov. 22, 1921.
8 SHEETS—SHEET 1.

INVENTOR
Thomas A. Ebaugh
BY
ATTORNEY

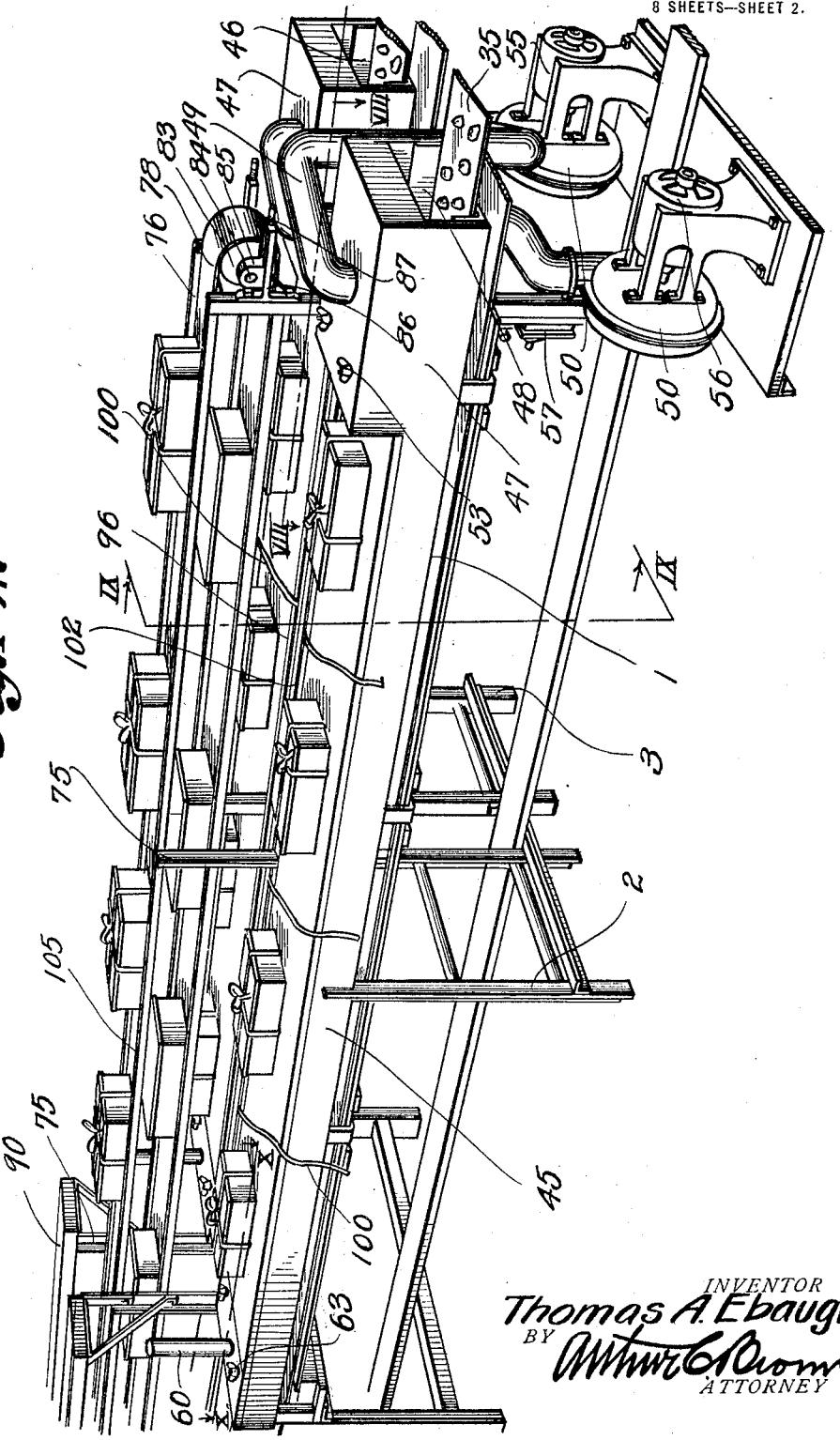

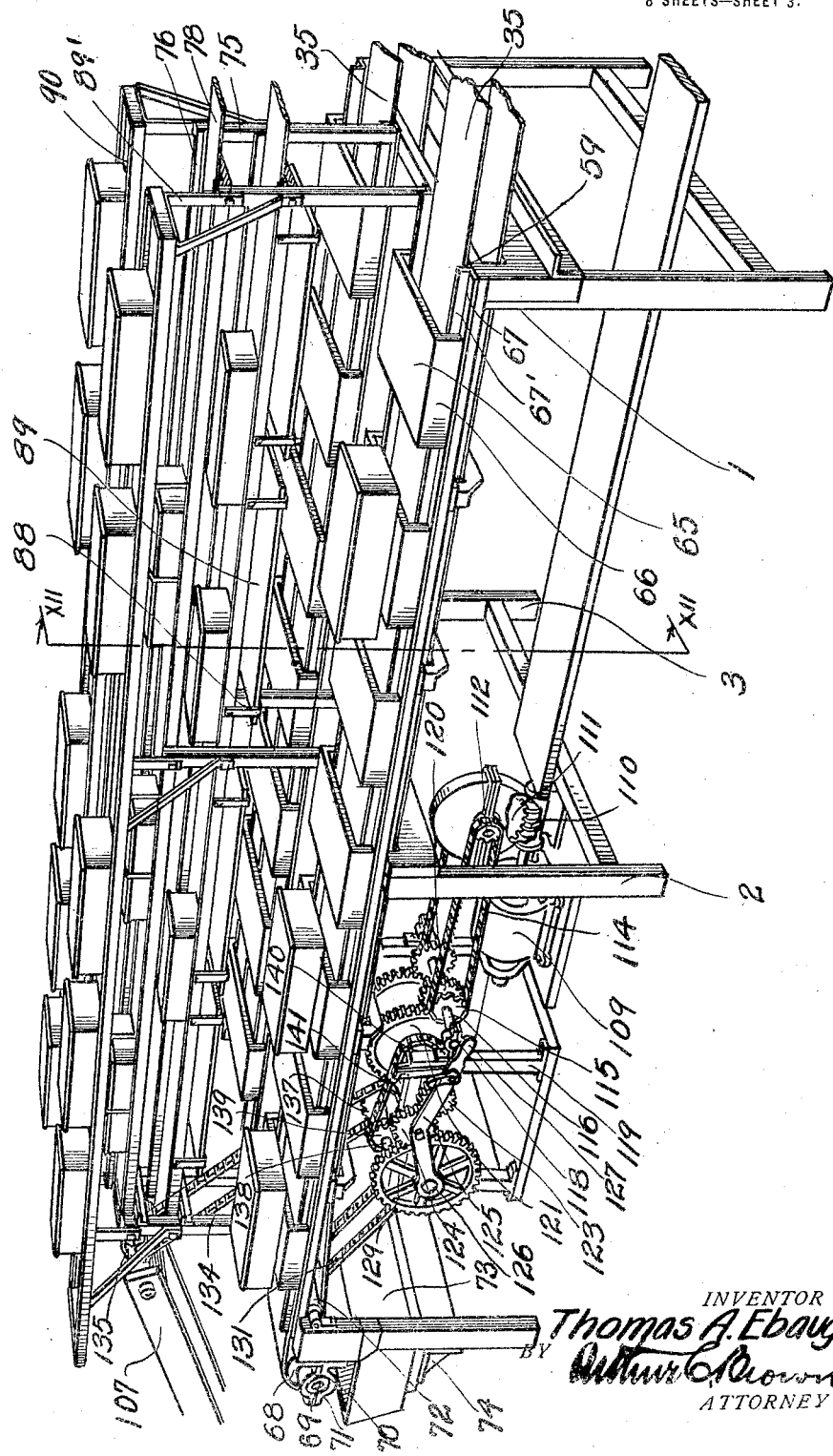

T. A. EBAUGH.
CONFECTION APPARATUS.
APPLICATION FILED NOV. 25, 1919.
1,397,757.
Patented Nov. 22, 1921.
8 SHEETS—SHEET 4.
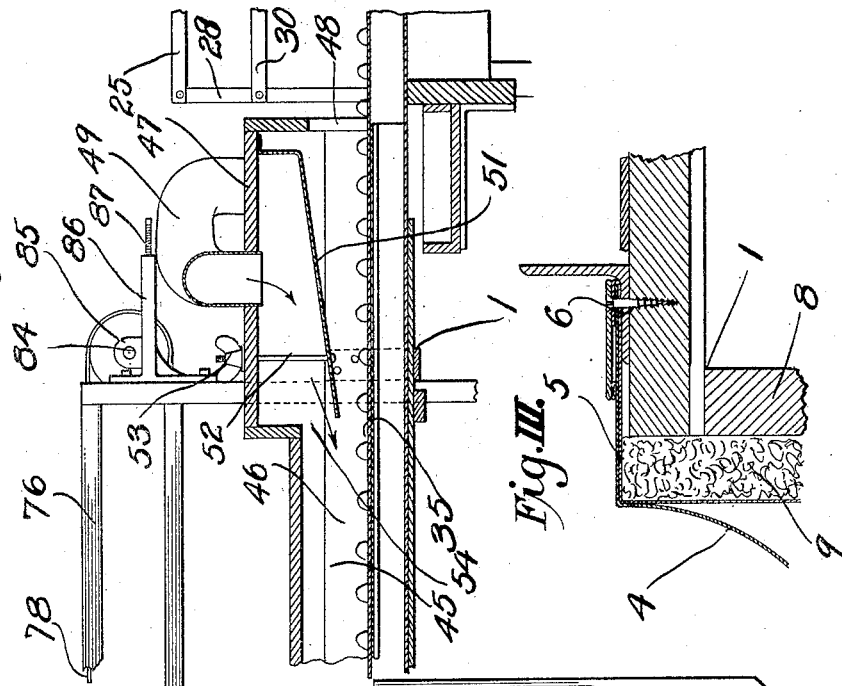
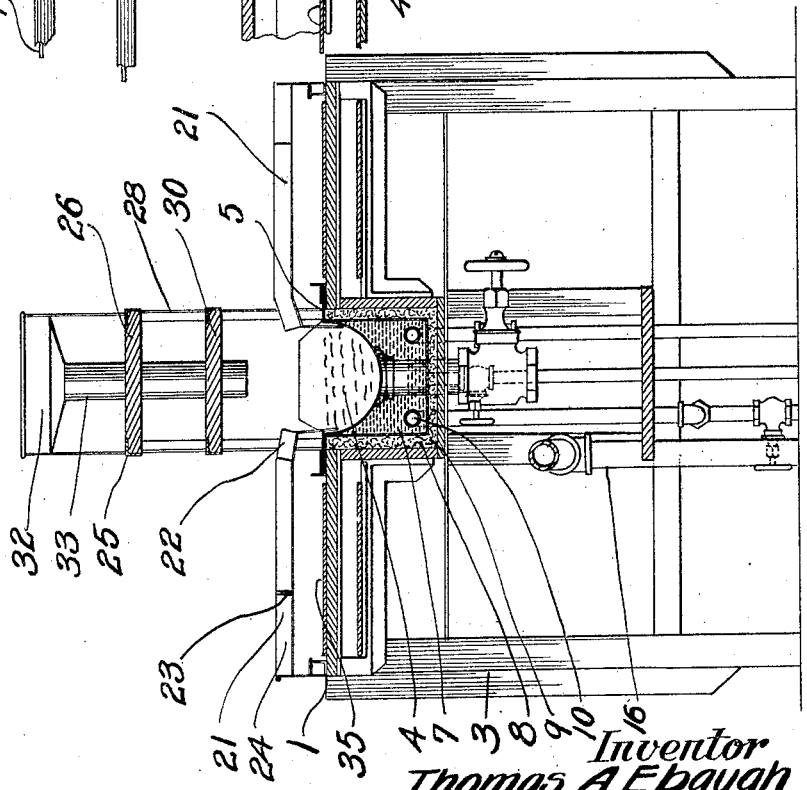
Inventor
Thomas A. Ebaugh
By Arthur C. Crown
Atty.

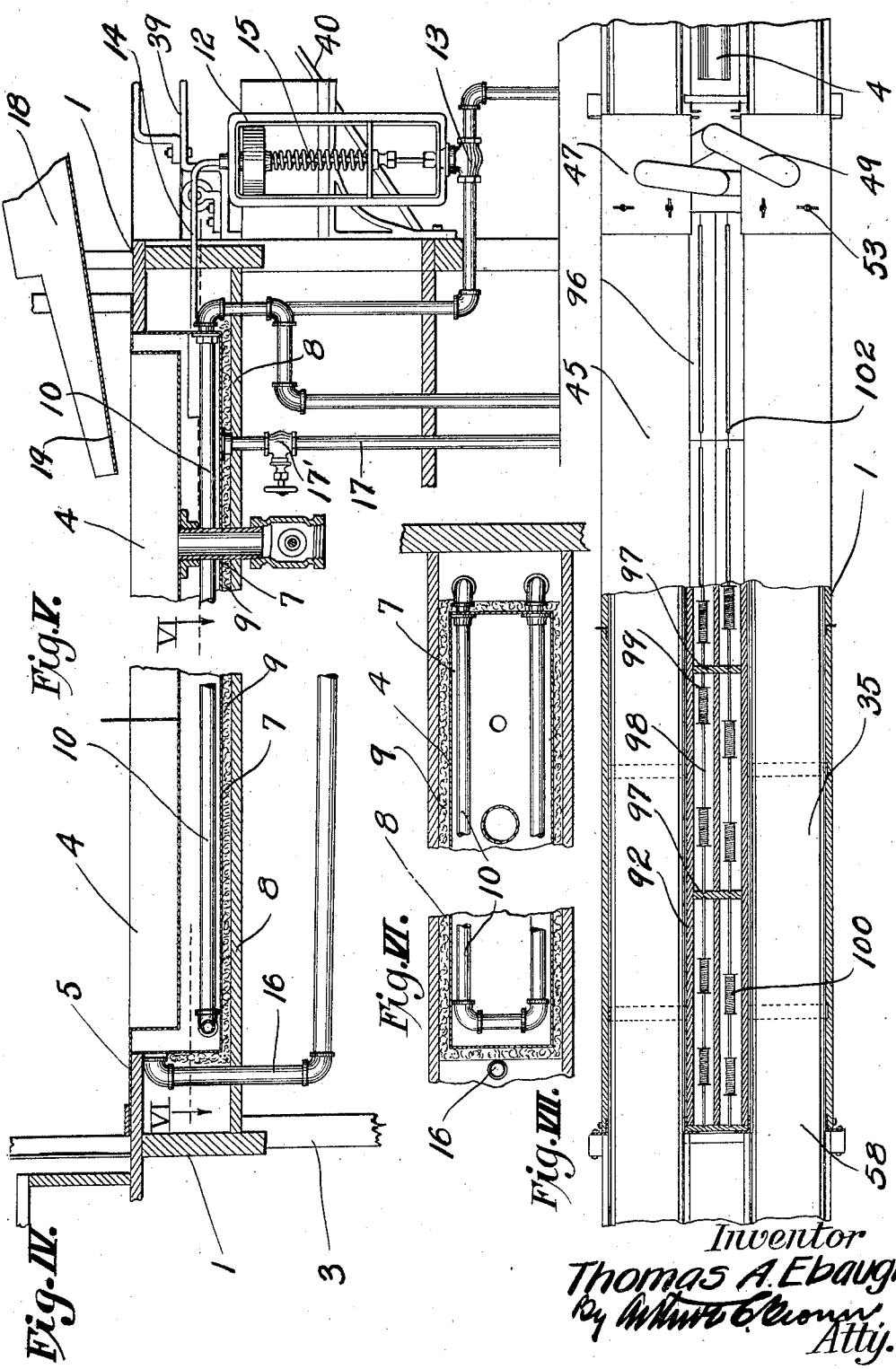

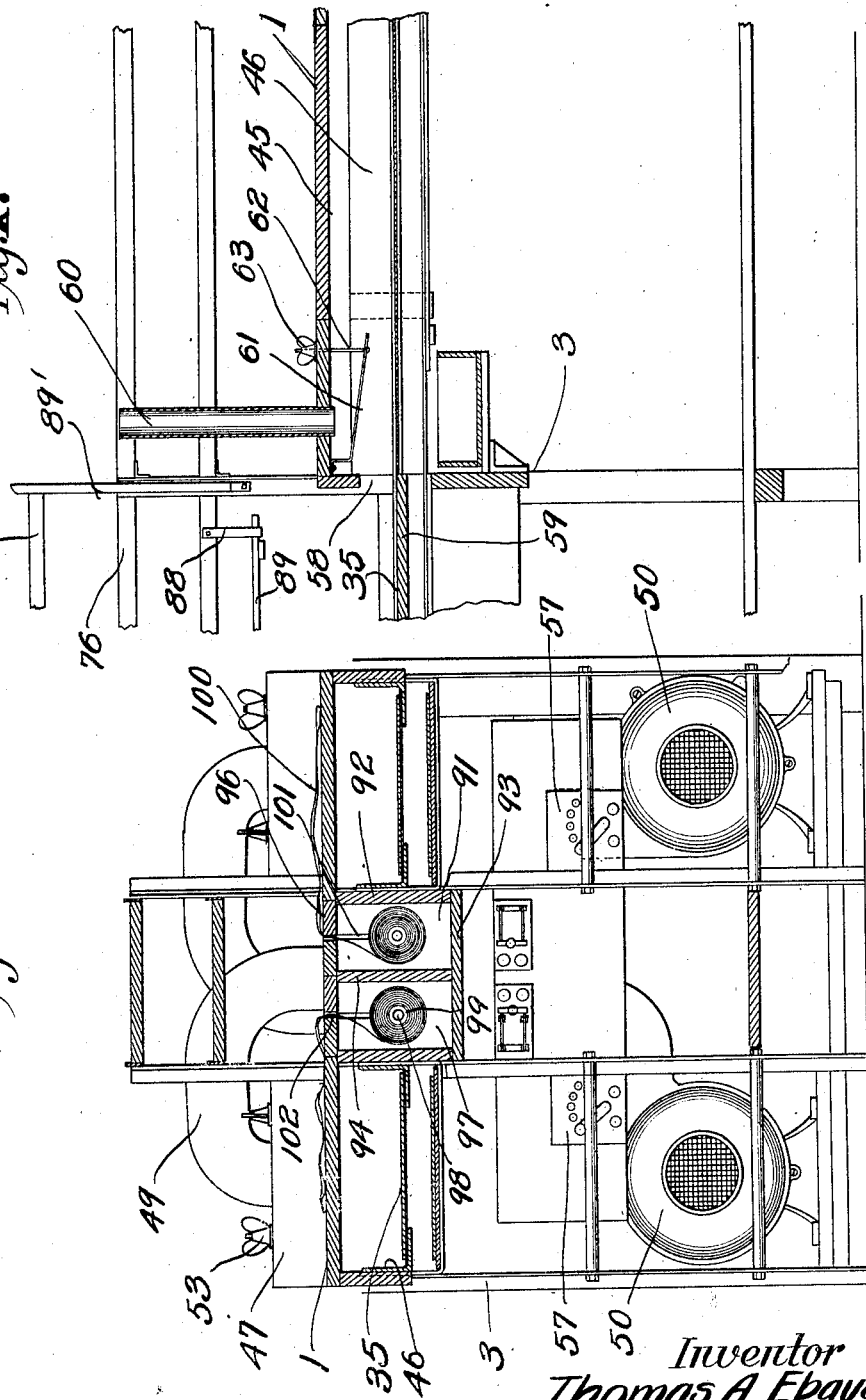

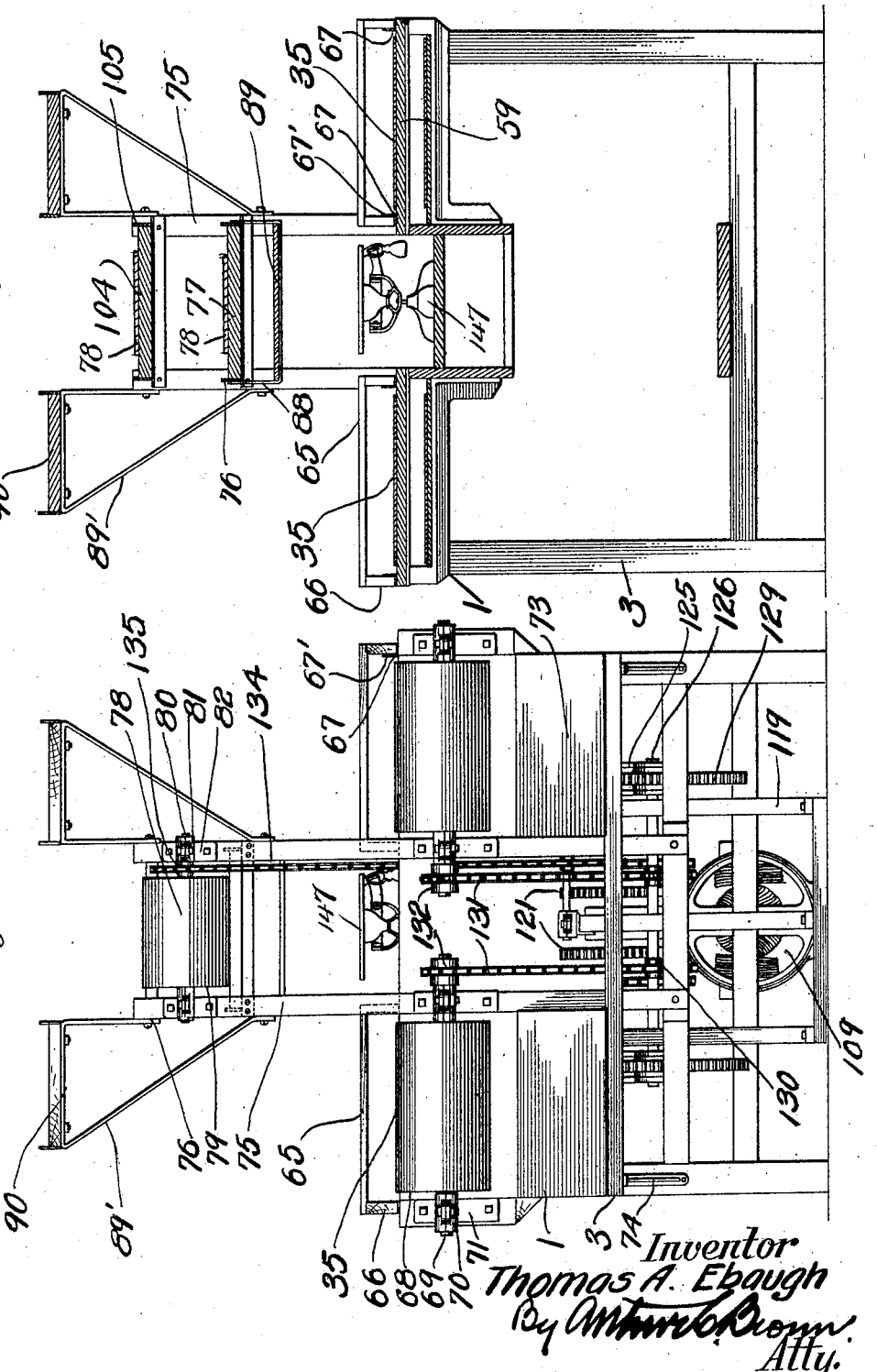

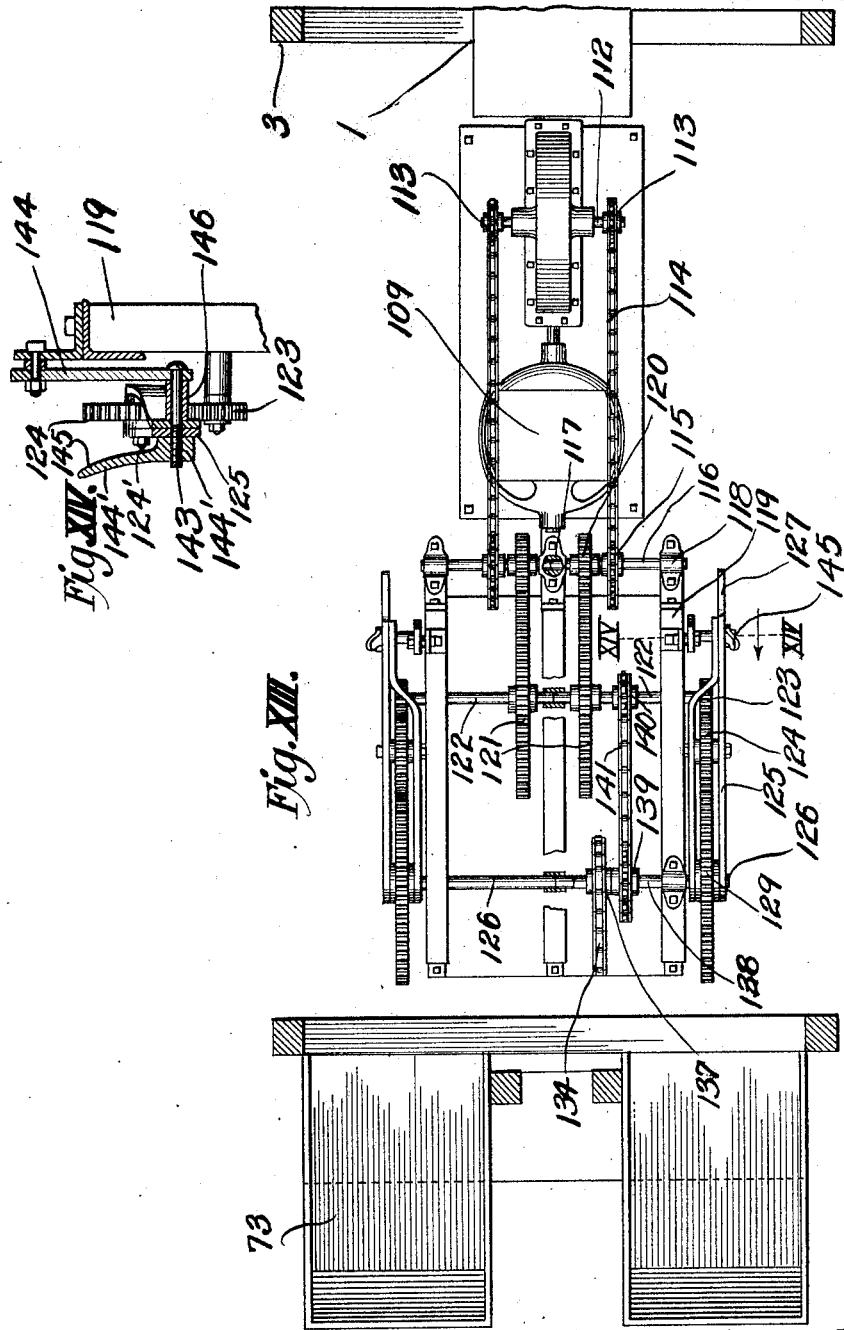

UNITED STATES PATENT OFFICE.

THOMAS ALVA EBAUGH, OF KANSAS CITY, MISSOURI.

CONFECTION APPARATUS.

1,397,757.　　　　　Specification of Letters Patent.　　Patented Nov. 22, 1921.

Application filed November 25, 1919. Serial No. 340,584.

*To all whom it may concern:*

Be it known that I, THOMAS A. EBAUGH, a citizen of the United States, residing at Kansas City, in the county of Jackson and State of Missouri, 3941 McGee street, have invented certain new and useful Improvements in Confection Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an apparatus for use in the manufacture of dipped confections and the illustrated embodiment thereof is designed for use in the manufacture of confections having chocolate coated centers, and it is one of the objects of the invention to so locate the various stations, conveyers, etc., that each operation may conveniently take place in its proper sequence and in a most convenient manner, the arrangement being such that the various stations and the operating mechanism coöperating therewith may be compactly associated to require a minimum amount of space.

It is also an object of the invention to maintain a uniformly and properly heated coating or "dip" (for example, chocolate) in such relation to the dipping tables and conveyers that the centers may be quickly dipped and the finished confections conducted quickly to coolers so that the chocolate will set as quickly as practicable for it is the quick setting of the coating that causes the desired luster to the finished products. The candies are then passed to packing tables so that they may be boxed with the least possible exposure to the air and thereby retain the freshness and luster characteristic of chocolates which have not been unduly exposed to dust in the atmosphere.

It is a well known fact that coating chocolate, that is, the chocolate into which the centers are to be dipped, must be maintained at a certain constant temperature to retain the desirable uniform color and luster in the finished product, as well as a consistency which will permit quick dipping and adhesion of the proper quantity of chocolate to the candy centers.

It is customary for manufacturers of the better grades of candy to furnish a selection or assortment of different kinds of coated centers in each box. Heretofore, the different kinds of candies have been dipped at individual stations, the dipped pieces placed on trays and conducted to packing stations, and there assorted and boxed. With this method, it often occurred that the dipped candies would remain exposed to the air for considerable periods of time, with the result that the finish became dull before the candies were boxed, and presented a less attractive appearance to purchasers. Particularly was this true where there was an over-production of one kind of candy since the excess could not be used until enough of all the other kinds was made to complete the assortment.

It is, therefore, one of the objects of my invention to provide a continuous operation from the dipping to the packing stations and to so time the operations that workers must maintain a determined efficiency in order that a uniform assortment in the respective boxes may be maintained.

It is also the purpose of my invention to effect a saving in both time and material over the known methods by eliminating unnecessary handling and by arranging the parts of the apparatus so that they are in convenient proximity to one another.

In accomplishing this object, I have provided improved details of structure, the preferred form of which is illustrated in the accompanying drawings, wherein:

Figures I, I^A and I^B (Sheets 1, 2 and 3) are continuous parts of a perspective view of a machine constructed in accordance with my invention.

Fig. II is an enlarged, cross sectional view on the line II—II of Fig. I, particularly illustrating the chocolate trough, the heater, the dipping pans and the conveyers.

Fig. III is an enlarged, vertical sectional view of a portion of the frame, showing a part of the chocolate trough and the insulation around the heating tank.

Fig. IV is an enlarged, vertical, longitudinal, sectional view, particularly illustrating the rear end of the chocolate trough.

Fig. V is a vertical longitudinal, sectional view of the front end of the chocolate trough, illustrating the heat supply and control elements.

Fig. VI is a horizontal section of the chocolate heating elements, illustrated in Figs. IV and V, the section being taken on line VI—VI, Figs. IV and V.

Fig. VII is a plan view of an intermediate portion of the machine, parts being broken away to show the ribbon spools.

Fig. VIII is a vertical section on the line VIII—VIII of Fig. I^A, illustrating the cooling air supply and conveyer.

Fig. IX is a cross sectional view on the line IX—IX of Fig. I^A, particularly illustrating the air blowers, ribbon bins and tying tables.

Fig. X is an enlarged, vertical sectional view on the line X—X of Fig. I^A, particularly illustrating the damper at the outlet end of the cooling tunnel.

Fig. XI is a view of the left hand end of the apparatus, particularly illustrating the conveyer belts with their driving mechanism and the empty box shells.

Fig. XII is a vertical, cross sectional view on the line XII—XII of Fig. I^B, particularly illustrating the conveyers for the dipped confections and the conveyers for the packed and tied boxes.

Fig. XIII is a plan view of the conveyer driving mechanism.

Fig. XIV is an enlarged, vertical section on the line XIV—XIV of Fig. XIII, illustrating the mounting of a speed controlling gear wheel.

Referring more in detail to the drawings:

1 designates a table consisting generically of the frame members 2 and 3, the form shown being merely illustrative as the parts are varied in arrangement within the length of the table to conform to the supported elements hereinafter described.

At one end of table 1 is a trough shaped container 4, located centrally of the table and preferably consisting of a half-round metal structure having edge flanges 5 overlying adjacent portions of the table and secured thereto by screws 6. The trough 4 extends for a considerable distance along the table as it must be of sufficient length to supply chocolate to all of the dipping stations of the apparatus.

The present drawings indicate that the trough extends through the part shown in Sheet 1 and into that shown in Sheet 2 and supplies twelve dipping stations, six on each side of the table. The body of the container is located within and forms the top of a heating tank 7, which is co-extensive with the dipping trough and preferably comprises a flat bottom and sides to set within a hollow frame 8 located at the center of the table and separated from the sides and bottom of the tank by asbestos or other heat retaining packing 9.

Located within the tank 7 is a coil 10, the ends of which enter and leave the trough at the primary end of the table and are connected with a suitable boiler or other heater (not shown) to effect a circulation of steam through the coil. The tank 7 is filled with water which is heated by the steam coil and maintained at a proper and desirable temperature by a theremostatic regulator 12 of any suitable type adapted for operating a valve 13 in the supply end of the coil. The thermostat shown in the drawings comprises an expansion rod 14 that is extended into the water in tank 7 and operates against the spring 15 to shut the valve when the water reaches a predetermined temperature, the valve being opened by the spring 15 when the rod 14 contracts upon lowering of the temperature in the tank.

The tank 7 is provided with an overflow pipe 16 and a drain pipe 17, the latter having a valve 17' whereby the flow of water through the drain pipe may be controlled.

It is not intended to primarily heat the chocolate in the container 4, as this container in no sense constitutes a cooker, the water jacket being merely intended to maintain the chocolate at a sufficient and uniform temperature to maintain it in a workable consistency. The chocolate is cooked in the ordinary kettles (not shown) and is supplied to the container through a feed hopper 18, having a nozzle 19 discharging over the primary end of the trough, the chocolate being delivered to the hopper at a flowing consistency so that it will readily pass into the trough and flow therealong to be accessible at the several dipping stations.

At each dipping station in a pan 21 before which the operator stands and which comprises an inclined vessel, the lower end of which overlies the chocolate trough 4 so that the operator may easily reach into the container 4 and lift the chocolate to the pans by hand. Only a small quantity of the chocolate is placed upon the pan as it is there exposed to the air and would there soon cool and harden to an extent that it would be impossible to properly apply to the candy centers.

Each of the pans is preferably provided with an offset 22 at its lower end to facilitate the lifting of the chocolate from the container to the pan and each pan is also preferably provided with a transverse partition 23 to form a receptacle 24 for containing a small quantity of the candy centers to be dipped, in a position convenient for the operator. The main supply of centers for each operator is located upon a rack 25 at the center of the table above the dipping pans.

The supply stations need not be individual, but preferably consist of a single shelf 26 supported over the center of the table 1 by suitable standards 28 and are of sufficient width to support the supply trays 29. While the shelf may be of any suitable construction, I preferably use one having the top shelf 26 and intermediate shelf 30, the latter of which may be used for temporarily holding rejected centers or for other purposes. The shelf 26 may also support an auxiliary chocolate hopper 32 having a neck 33 extending to a point slightly above container 4 so that chocolate may be delivered at intervals along the length of the container to obviate the necessity for a flow throughout the full length of the container from a single hopper 18.

The pay of the operator is ordinarily based on production, and, as the finished product is sold on a weight basis, the compensation of the operator is figured on a like basis. In order, however, to avoid any inducement to over-dip, the compensation is based on the weight of the centers rather than on the finished candies. These centers are weighed and delivered to the operators on trays, each operator working from her individual tray. Consequently, in order to provide for the maximum production, each dipping station should be accessible to a supply station to which the trays are brought and from which the trays are brought and from which the candy centers are taken by the operator as required.

As before stated, it is desirable to cool the coated candies as soon as possible after they are dipped and to remove the candies from exposure to the air. For accomplishing these objects and also as a matter of convenience and efficiency, I provide suitable conveyers onto which the dipped candies may be placed by the operators without moving from their stations and without the necessity for accumulation of a quantity of candy before it is removed from the station. A conveyer of this character is located at each side of the table and comprises a belt 35 of sufficient width to accommodate several rows of candy. This belt extends throughout the length of the table and is exposed at the primary end or front of the machine so that the candy may be placed thereon by the operators as the belt moves along the dipping stations. The primary end of the belt runs over a roller 36 on a shaft 37 that is journaled in a bearing 38, slidably mounted in a track 39, fixed on a bracket 40 that is rigidly attached to the end of the table 1, preferably by bolts 41. Journaled in the end of the track 39 is a rod 42 having a hand wheel 43. One end of the rod bears against the end of the track, the end of the rod located within the track being threaded into the journaled block 38 so that when the hand wheel is rotated to turn the rod, the block will be moved inwardly or outwardly to adjust the tension of the belt. The apparatus preferably comprises four belt tighteners, one on each of the bearing blocks of the two conveyer belts.

The belt 35 extends rearwardly from the dipping section of the table into a cooling tunnel 45 (Figs. I^A, VII and VIII) formed at the side of the table. To the sides of the tunnel are attached angle irons 46 which support the upper run of the belt to retain it horizontal under the weight of the candy and afford circulation of air, the bottom of the tunnel being preferably closed and the return run of the belt being supported on the tunnel bottom. At the forward end of the tunnel is an intake box 47 having an opening 48 through which the runs of the belt may enter and leave the tunnel and to which the conduit 49 delivers a blast of cooled air from the blower 50. The box 47 contains a deflector 51 for directing the air blast rearwardly into the tunnel and away from the opening 48 to direct the circulation and avoid drafts in the work room. The deflector 51 is preferably composed of sheet metal which may flex, and connected with the lower end of the sheet is a rod 52 which extends up through the top of the box 47 and carries a wing nut 53, it being apparent that the deflector will spring downwardly to assume a lower position but may be drawn up to narrow the neck 54, leading to the tunnel, therefore affording adjustment to valve the volume of the blast.

Inasmuch as a considerable space is required for the tunnel on account of the width of the conveyer belt and as the belt is run at a convenient level, I utilize the top of the tunnel as a working table or platform for a succeeding operation in the preparation of the candy, by running a different conveyer back through the center of the table onto which the candy may be placed when boxed and may then be conducted to a station where the box may be tied or ribboned. This operation and the construction of the table for making it possible will be later described.

The dipping operation may be conducted on but one side of the table, if desired, and it would be necessary, under such conditions, to cool but one of the tunnels. I have, therefore, provided each tunnel with an individual blower and the blowers are, therefore, shown as operated from individual motors 55, controlled by corresponding switches 56 and rheostats 57. At the end of each tunnel 45 is an opening 58 through which the upper run of the conveyer belt leaves the tunnel and moves onto a platform 59, which will presently be described in connection with the boxing operation.

Extending through the top of the tunnel is a vent pipe 60 and running beneath the vent pipe and in front of the opening 58 is a deflector 61, having a supporting rod 62 and an adjusting nut 63 like the rod and nut on the forward deflector and whereby the outlet of the cooled air is regulated through the vent pipe and belt opening.

The candy, having been cooled during its travel through the tunnel, is ready for boxing as it reaches the platform 59 and it is along this platform that the packing stations are located.

The packing stations consist of arched shelves 65, (Fig. XII) the ends 66 of which rest on the platform 59 and are held in place by the flanges 67' of angle members 67 that are fixed to the top of the platform. The shelves 65 are only of sufficient width to conveniently support the boxes into which the candy is to be transferred from the conveyer belt, so that the operator may take the pieces of candy from the belt at either side of the packing shelf as the conveyer moves along beneath the shelf and deposit it in the boxes. There are as many packing shelves as are required for the number of packers necessary to take care of a maximum output of the dipping stations, though the exact ratio cannot be stated for the reason that the ratio of time for dipping and packing some kinds of candy differs from the ratio for other kinds of candy.

The packing station section of the table extends to the rear end of the apparatus and there each conveyer belt runs over a roller 68, the shaft 69 of which is rotatably mounted in bearings 70 on bracket 71, attached to and projected rearwardly from the end of the table frame, the lower run of the belt being guided backwardly and upwardly to a point slightly beneath the angle members 46 by idle rollers 72, the lower run of the belt being idle throughout the length of the table, but supported close to the upper run to avoid interference from or with the operators.

At the rear end of the table is a drip bin 73 supported on brackets 74 that are attached to the table, and which serves to catch loose pieces of candy, chocolate coating or foreign matter of any kind which may drop onto the belt during the dipping and packing operation.

When the candy has been packed in the boxes, it is returned to a tying station on a conveyer belt located in a frame work that extends above the table between the packing platforms. This framework consists of standards 75 and spaced rails 76 attached to the standards which carry a shelf 77 to support the belt 78. The belt 78 runs over a roller 79, the shaft 80 of which is journaled in bearings 81 on brackets 82 attached to the standards 75. The belt 78 extends only to the forward end of the tying section, that is, to the forward end of the cooling tunnels, where it is run over a roller 83, the spindles 84 of which rotate in bearings 85, slidably mounted in brackets 86, the sliding mounting providing for the adjustment of the roller by a screw 87 to tension the belt when necessary. The lower run of the belt moves forwardly so that when the boxes have been packed and are placed thereon, they are carried forwardly to the tying stations.

Suspended from the rails 76 by hangers 88 are shelves 89 for storing paper cups, partition sheets or the like, convenient to the packing stations. Supported on extensions 89' on the standards 75 is a shelf 90 for storing empty boxes within easy reach of said stations. The shelves 89 and 90 are at such levels that the articles may be easily placed thereon by helpers without disturbing the packers. The lower run of the belt 78 extends forwardly along the center or tying section of the table, over bins 91 that are located between the tunnels and are formed by the inclosing side members 92, a bottom 93, vertical partitions 94, and covers 96. The bins 91 are divided into sections by transverse, vertical partitions 97 and mounted in said partitions and extending through the bin sections are rods 98 upon which are revolubly mounted the spools 99 of tying ribbon 100. The rods are preferably removably mounted in the partitions through slots 101 which extend through the upper ends of the partitions so that the rods may be quickly and easily placed in their seats and removed therefrom when the spools are renewed. The ribbons 100 extend from the spools through slots 102 in the covers 96 so that they are accessible to the tying operators who stand along the platforms formed by the tops of the tunnels.

As the filled boxes of candy move forwardly on the conveyer belts, the operators remove them to the tying platforms and there tie them with the ribbons that are drawn from the spools. The outside wrappers are applied to the containers at this point.

After the boxes are tied and wrapped, they are placed on the upper run of the belt 78 which returns rearwardly at a higher level after passing around the roller 83 at the front end of the tying section. The upper run of the conveyer belt is supported in horizontal position by a shelf 104 which is mounted in the upper rails 105 carried by the standards 75. The packed and ribboned boxes are conducted to the rear end of the table and may then be delivered to an off-taking conveyer 107 and delivered to a storage or shipping room or to any other location.

As heretofore stated, there is a conveyer belt at each side of the table and each belt operates independently of the other, thereby adapting the belts for use individually and for different grades and kinds of candy requiring different groups of operators at the several stations. This may require the use of but one belt, while the other is idle, or that one belt travel at substantially greater speed than the other. In order to provide this differential speed, I drive the conveyer belts independently of each other but from the same power source. This differentiation and individual operation is effected through a transmission, the preferred form of which is illustrated in Fig. I$^B$ (Sheet 3) and Figs. XI, XIII and XIV.

The driving mechanism comprises a motor 109, here illustrated as an electric motor, having a worm drive shaft 110 meshing with the worm wheel 111 provided with a shaft 112, the ends of which carry sprocket wheels 113. Running over the sprocket wheels 113 are chain belts 114 for operating the sprocket wheels 115 on individual, alining shafts 116, the inner ends of which revolve in a common bearing 117 and the outer ends of which revolce in individual bearings 118 on a transmission frame 119. From this point forward, the driving mechanism is paired, with each member of the pair connected with its corresponding conveyer belt. Therefore, but one of the members of the pair will be described in detail with the understanding that such description relates equally to both.

Fixed on the shaft 116 is a pinion 120 meshing with a gear wheel 121 on a shaft 122 journaled in bearings on the frame 119. On the end of the shaft 122 is a pinion 123 meshing with an idler 124 journaled in bearings in a forked lever 125, one end of which is pivoted on a shaft 126 at the rear of the frame 119, the other end of the lever comprising a handle 127 whereby the lever and the idler carried thereby may be raised and lowered from and into mesh with the pinion 123. This mechanism is provided to serve as a clutch between the pinion 123 and the secondary shaft 126 and also to permit replacement of the pinion 123 for speed changes, it being apparent that a larger or smaller pinion may be used on the primary shaft 122 according to the speed desired, the gears following the pinion being of fixed dimensions and the idler adapted for meshing with the pinions at whatever point they meet. The clutch gear 124 meshes with a gear 129 on the secondary shaft 126 to drive said shaft, and also fixed on the shaft 126 is a sprocket wheel 130 carrying a belt 131 which runs over a sprocket wheel 132 on the shaft 69 of the roller 68, carrying the lower conveyer belt 35 that runs from end to end of the table along the dipping, cooling, and packing stations. The upper conveyer belt 78 that conducts the filled boxes forwardly to the tying stations and the tied boxes back to the off-take belt is driven through a chain belt 134 which runs over a sprocket wheel 135 on the shaft 80 of roller 79 that carries the upper conveyer belt and over sprocket wheel 137 on a shaft 138 journaled in bearings on the frame 119. The shaft 138 also carries a sprocket wheel 139 and running over said wheel and a wheel 140 on the primary shaft 122, is a belt 141. With this arrangement, the upper conveyer belt is driven independently of the lower belts so that it will operate whenever either of the lower belts is operating and may continue to run after the lower belts have stopped, thereby permitting the apparatus to clear the packed boxes after the lower belts have stopped and avoiding loss of time in cleaning up the lower portion of the apparatus at the end of a run.

The clutch lever 125 is formed in two pieces, the outer one of which is removable from the mounting on the shaft 126 and the stub 124' which carries the idler wheel so that the idler wheel may be removed for replacement, the outer member being held in assembled relation with the inner member by a bolt 143 (see Fig. XIV) which extends through an arm 144 on the frame 119 through both members of the lever and carries a nut 144' on its outer end, having a handle 145 whereby it may be manipulated to clamp or release the lever members. The inner lever member is bent outwardly to lie flat against the outer member near the handle position and the bolt 143 carries an elongated washer 146 for spacing the end of the inner lever member from the arm 144.

In using the apparatus, assuming the parts to be assembled as described, the chocolate container is heated to the proper temperature and the chocolate delivered to the container through the hopper from the cooking kettles. The centers are supplied to the several dipping stations on trays, each having been weighed and the individual dippers credited with the supply in order to base their compensation upon the amount of candy each operator dips. Each operator then removes a supply of chocolate from the container onto the dipping pans and a supply of centers from the trays onto the partition at the end of the pan. When an assortment is to be used, each operator may have a certain kind of centers so that if ten operators are dipping, ten different kinds of candy may be used, each operator dipping but one kind. After the candy is dipped, it is placed on the conveyer belt that moves beneath the dipping pan and conducted to the cooling tunnel. Each dipper is assigned a certain position on the conveyer belt so that when the candy reaches the packers, the packers will know what selection to make. This selection is best effected by requiring each operator to place her candy in a row on the belt. The ten operators will then place ten different rows of candy on the conveyer belt and the packers will take a certain number from each row for each box. It is apparent that this plan of operation will require all of the operators to work at the same relative speed in order to maintain a uniform assortment for the packers.

After the candy has passed through the cooling tunnel, it reaches the packing stations to be removed by the operators who place it in boxes with or without the paper cups which have heretofore been mentioned. The boxes are preferably weighed at the packing stations on the scales 147 illustrated in the drawings and which are located at convenient points along the packing shelves.

After the candy is packed, it is placed on the lower run of the upper rear conveyer and moved forwardly to the tying stations and after it is tied, it is placed upon the upper run of the belt and moved back to the offtaking conveyer.

It is apparent, therefore, that all of the available space throughout the length and width of the table is utilized, and that by arranging the table for consecutive operations, the operators do not interfere with each other, and that the candy is conditioned for packing and removed from exposure to the air in the least possible time, thereby insuring a maximum output at a minimum labor cost and further insuring the ultimate delivery of candy to the consumer in the most acceptable condition.

What I claim and desire to secure by Letters-Patent is:

1. In a confection machine, a frame, a chocolate trough-shaped container longitudinally supported by the frame and extending from end to end of the frame, dip trays carried by the frame and along the edge of the container, and a conveyer running past the dip trays.

2. In a confection machine, a frame, a chocolate trough-shaped container longitudinally supported by the frame and extending from the end of the frame, dip trays carried by the frame and along the edge of the container, and a conveyer running past the dip trays and longitudinally of the frame.

3. In a confection machine, a frame, a chocolate trough-shaped container longitudinally of the frame and extending from end to end of the frame, means for maintaining a constant temperature in the container, dip trays positioned along the sides of the container, and a longitudinally movable conveyer movable past the dip trays.

4. In a confection machine, a frame, a chocolate container carried by the frame, means for delivering chocolate to the container, means for maintaining the chocolate in the container at a determined temperature, dipping pans arranged longitudinally of the container, a conveyer movable longitudinally of the frame and adjacent to the dipping pans, and a return conveyer having a receiving portion adjacent to the discharge end of the first conveyer.

5. In a confection machine, a frame, a chocolate container carried by the frame, means for delivering chocolate to the container, means for maintaining the chocolate in the container at a determined temperature, dipping pans arranged longitudinally of the container, a conveyer movable longitudinally of the frame and adjacent to the dipping pans, a return conveyer having a receiving portion adjacent to the discharge end of the first conveyer, and a third conveyer having a receiving portion adjacent to the discharging end of the second mentioned conveyer.

6. In a confection machine, a frame, a chocolate container carried by the frame, means for delivering chocolate to the container, means for maintaining the chocolate in the container at a determined temperature, dipping pans arranged longitudinally of the container, a conveyer movable longitudinally of the frame and adjacent to the dipping pans, a return conveyer having a receiving portion adjacent to the discharge end of the first conveyer, and a third conveyer having a receiving portion adjacent to the discharging end of the second mentioned conveyer, said third conveyer delivering in the direction of the receiving end of the second mentioned conveyer.

7. In a confection machine, a frame, a trough-shaped chocolate container, carried by the frame, a delivery hopper at one end of the container, a water jacket about the container, dipping pans along the edge of the container and extending over the same, candy center-carrying supports adjacent to the dipping pans, and a conveyer movable longitudinally of the frame and past the dipping pans.

8. In a confection machine, a frame, a trough-shaped chocolate container, carried by the frame, a delivery hopper at one end of the container, a water jacket about the container, dipping pans along the edge of the container and extending over the same, candy center-carrying supports adjacent to the dipping pans, a conveyer movable longitudinally of the frame and past the dipping pans, a box-carrying conveyer adjacent to and above the first named conveyer, and a box-discharging conveyer adjacent to the second mentioned conveyer.

9. In a confection machine, a frame, a chocolate container longitudinally supported by the frame, dip trays adjacent to the chocolate container, an endless belt moving longitudinally of the frame and adjacent to the trays, a superposed frame carried by the first named frame, and oppositely movable conveyers carried by the superposed frame.

10. In a confection machine, a frame, a chocolate container longitudinally supported by the frame, dip trays adjacent to the chocolate container, an endless belt moving longitudinally of the frame and adjacent to the trays, a superposed frame carried by the first named frame, oppositely movable conveyers carried by the superposed frame, and shelves on the superposed frame and on opposite sides of the belt.

11. In a confection machine, a frame, a chocolate container carried by the frame, dip trays adjacent to the chocolate container, a conveyer having an exposed surface adjacent to the trays, a tunnel carried by the frame through which the conveyer passes, means for directing cooling air into the tunnel, and means for controlling the volume of air passing into the tunnel.

12. In a confection machine, a frame, a chocolate container carried by the frame, dip trays adjacent to the chocolate container, a conveyer having an exposed surface adjacent to the trays, a tunnel carried by the frame through which the conveyer passes, means for directing cooling air into the tunnel, means for controlling the volume of air passing into the tunnel, said means comprising a flexible valving sheet, and means for flexing the sheet to control the effective air port area of the tunnel.

13. In a confection machine, a frame, a chocolate container carried by the frame, dip trays adjacent to the chocolate container, a conveyer having an exposed surface adjacent to the trays, a tunnel carried by the frame through which the conveyer passes, means for directing cooling air into the tunnel, said means comprising an air impeller, a conduit leading from said air impeller and discharging into the tunnel, and a deflector below the discharge end of the conduit.

14. In a confection machine, a frame, a chocolate container carried by the frame, dip trays adjacent to the chocolate container, a conveyer having an exposed surface adjacent to the trays, a tunnel carried by the frame through which the conveyer passes, means for directing cooling air into the tunnel, said means comprising an air impeller, a conduit leading from said air impeller and discharging into the tunnel, and a valving deflector below the discharge end of the conduit.

15. In a confection machine, a frame, a chocolate container carried by the frame, dip trays adjacent to the chocolate container, a conveyer having an exposed surface adjacent to the trays, a tunnel carried by the frame through which the conveyer passes, means for directing cooling air into the tunnel, said means comprising an air impeller, a conduit leading from said air impeller and discharging into the tunnel, a valving deflector comprising a flexible sheet, and means for flexing said sheet.

16. In a confection machine, a frame, a chocolate container longitudinally supported by the frame, a conveyer moving longitudinally of the frame to convey dipped candies, a tunnel through which the conveyer passes, means for cooling said tunnel, box supports carried by the frame beyond the tunnel, and cord storing devices adjacent to the box supports.

17. In a confection machine, a frame, a chocolate container longitudinally supported by the frame, a conveyer moving longitudinally of the frame to convey dipped candies, a tunnel through which the conveyer passes, means for cooling said tunnel, box supports carried by the frame beyond the tunnel, and cord storing devices adjacent to the box supports, said cord storing devices comprising cord-carrying reels carried by the frame.

18. In a confection machine, a frame, a chocolate container longitudinally supported by the frame, dip trays adjacent to the container, a conveyer longitudinally of the frame, a tunnel through which the conveyer passes, means for admitting cooling air to said tunnel, the tunnel having means for exhausing the air, and means for varying the effective port area of the exhaust.

19. In a confection machine, a frame, a chocolate container longitudinally supported by the frame, dip trays adjacent to the container, a conveyer longitudinally of the frame, a tunnel through which the conveyer passes, means for admitting cooling air to said tunnel, the tunnel having means for exhausting the air, means for varying the amount of air introduced into said tunnel, and means for varying the effective port area of the exhaust.

In testimony whereof I affix my signature.

THOMAS ALVA EBAUGH.